United States Patent
Travez et al.

(10) Patent No.: US 7,293,942 B2
(45) Date of Patent: Nov. 13, 2007

(54) TOOL APPARATUS

(75) Inventors: Italo D. Travez, Arlington, VA (US); Jose M. Travez, North Potomac, MD (US); Eric F. Cabahug, Fairfax, VA (US)

(73) Assignee: Prototype Productions, Inc., Ashburn, VA (US)

( * ) Notice: Subject to any disclaimer, the term of this patent is extended or adjusted under 35 U.S.C. 154(b) by 0 days.

(21) Appl. No.: 10/971,006

(22) Filed: Oct. 25, 2004

(65) Prior Publication Data

US 2006/0026847 A1 Feb. 9, 2006

Related U.S. Application Data

(63) Continuation of application No. 10/235,930, filed on Sep. 6, 2002, now Pat. No. 6,808,340.

(51) Int. Cl.
*B23B 29/12* (2006.01)

(52) U.S. Cl. .................... 408/239 R; 82/158; 407/102

(58) Field of Classification Search ............... 408/238, 408/239 R, 239 A, 56; 407/11, 101, 102; 279/83; 82/158, 121; *B23B 29/06, 29/04*
See application file for complete search history.

(56) References Cited

U.S. PATENT DOCUMENTS

| | | | | |
|---|---|---|---|---|
| 1,011,667 A * | 12/1911 | Taylor | | 407/78 |
| 1,405,714 A * | 2/1922 | Miller et al. | | 407/102 |
| 1,779,059 A * | 10/1930 | Burkart et al. | | 407/8 |
| 2,096,137 A * | 10/1937 | Shaw | | 407/4 |
| 2,260,373 A * | 10/1941 | Gibbs | | 407/97 |
| 2,418,734 A * | 4/1947 | Steffes | | 407/87 |
| 2,556,723 A * | 6/1951 | Hoffart | | 407/91 |
| 2,577,043 A * | 12/1951 | Steffes | | 407/87 |
| 2,718,689 A * | 9/1955 | Mason et al. | | 407/42 |
| 2,940,765 A | 6/1960 | Appleby | | |
| 3,375,742 A * | 4/1968 | Sturm | | 82/159 |
| 3,402,625 A * | 9/1968 | Sweeny | | 82/158 |
| 3,404,590 A * | 10/1968 | Sweeny | | 82/158 |
| 3,795,160 A | 3/1974 | Janiszewski | | |
| 3,808,656 A * | 5/1974 | Lindskog | | 407/11 |
| 4,647,052 A * | 3/1987 | Butikofer | | 279/83 |
| 5,080,536 A | 1/1992 | Andrews | | |
| 5,261,233 A | 11/1993 | Kishi | | |
| 6,808,340 B2 * | 10/2004 | Travez et al. | | 408/239 R |
| 2002/0035902 A1 * | 3/2002 | Ericksson et al. | | 82/158 |

FOREIGN PATENT DOCUMENTS

DE 1552502 12/1969

(Continued)

OTHER PUBLICATIONS

Canadian office action dated Aug. 18, 2007.

(Continued)

*Primary Examiner*—Daniel W. Howell
(74) *Attorney, Agent, or Firm*—John W. Ryan, Esq.; Crowell & Moring, LLP

(57) ABSTRACT

A cutting tool apparatus having a shank and a tool support extension disposed longitudinally adjacent the shank and extending in a direction distal the shank, wherein the tool support extension includes an incurvate taper profile.

20 Claims, 17 Drawing Sheets

FOREIGN PATENT DOCUMENTS

| | | |
|---|---|---|
| DE | 4213610 A1 | 10/1992 |
| FR | 2495978 A * | 6/1982 |
| GB | 2083386 A * | 3/1982 |
| GB | 2212078 A * | 7/1989 |
| JP | 05038605 A * | 2/1993 |
| JP | 06023607 A * | 2/1994 |
| JP | 09094731 A * | 4/1997 |
| WO | WO 9317821 A1 * | 9/1993 |

OTHER PUBLICATIONS

German office action dated Feb. 27, 2007 with partial English translation.

* cited by examiner

TOOL APPARATUS

This application is a continuation of application Ser. No. 10/235,930, filed on Sep. 6, 2002 now U.S. Pat. No. 6,808,340.

BACKGROUND AND SUMMARY OF THE INVENTION

Tool holders are used in various machine tools, such as turning centers and lathes, for the purpose of holding a variety of different tools such as boring bars. Boring bars are typically used by a turning center machine tool during a boring operation, the purpose of which is to increase the size of pre-existing internal features of a workpiece while obtaining target size and surface finish accuracy. Under very rigid tool setups, boring operations are often capable of maintaining a size tolerance within 0.0002".

A turning center machine tool includes a workpiece spindle for holding and spinning a workpiece, and may further include a tool spindle, tail-stock, or tool turret for holding a tool holder and tool. A tailstock typically includes a socket into which a rearward end of the tool holder is inserted. Some tool holders have a generally cylindrical shank that extends forward from the rearward end and that includes one or more longitudinal flats for orienting the tool holder within the tailstock socket and for use with a setscrew fastening arrangement. The shank typically terminates at a mounting flange for axially locating the tool holder against an outboard face of the machine tool tailstock. Forward of and adjacent the mounting flange there is provided a set screw diameter through which set screws radially extend and intersect with a tool bore that axially extends through the tool holder for accepting a boring bar therein.

The boring bar is typically a generally cylindrical tool having a fastening end that inserts into the tool bore of the tool holder. Extending forward from the fastening end, the boring bar includes a solid shank having one or more longitudinal flats against which the tool holder set screws are fastened for holding the boring bar within the tool bore of the tool holder. Extending further forward, and opposite the fastening end, the boring bar terminates in a seat portion into which a cutting insert fastens.

The distance between the tip of the cutting insert and an outboard face of the set screw diameter of the tool holder defines what is known as the unsupported overhang of the boring bar. In general, the greater the ratio between the length of the unsupported overhang to the diameter of the boring bar—the lesser the rigidity of the tool setup. Lesser tool rigidity results in tool vibration and chatter, thereby necessitating reductions in machining federates and throughput in order to maintain workpiece accuracy and surface finish.

Boring of workpieces having stepped diameters, or variably sized internal features, presents a special problem for boring tools. A stepped diameter workpiece is one having a shallower, larger diameter and one or more deeper, smaller diameters. The shallower, larger diameter of the workpiece is relatively proximate the tool holder, thereby requiring very little unsupported overhang of the tool and permitting a more rigid and larger diameter boring bar to be used. Thus, the shallower, larger diameter can often be cut relatively quickly and accurately due to the rigidity of the tool setup. In contrast, the deeper, smaller diameters are relatively distal the tool holder, thereby necessitating longer unsupported overhang and smaller diameter of the boring bar.

To reach the deeper, smaller diameters, the machining process must be interrupted to change from a rigid, larger diameter boring bar to a smaller diameter boring bar having a longer unsupported overhang. Such an interruption is a major risk to workpiece accuracy for at least a couple of reasons. First, using a smaller diameter boring bar sacrifices tool rigidity due to a corresponding decrease in cross-sectional surface area and beam strength of the tool. Second, a tool change disrupts the dimensional relationship between the shallower, large diameter and the deeper, smaller diameter since two different tools must be used. Simply put, using two different tools is undesirable since the subsequent tool will not necessarily pick up exactly where the original tool left off in the cut. Conversely, it is desirable to use the same single tool to cut both diameters to maintain continuity of the cut and thereby more strictly maintain the dimensional relationship between the diameters.

Moreover, using two different tools results in increased manufacturing time and costs. First, interrupting the machining operation to execute a tool change results in increased machine cycle time. Second, the deeper, smaller diameters must be cut magnitudes more slowly than the shallower, larger diameters. Slow machining is necessary to maintain the same size accuracy throughout the workpiece when cutting the workpiece with the smaller diameter boring bars having long unsupported overhangs. In a manufacturing environment, every second of cycle time is accounted for. Thus, where time is money, unnecessarily slow machining performance translates into unnecessarily high manufacturing costs.

Another special problem with boring involves the interconnection of carbide boring bars to boring bar tool holders. Carbide boring bars are cylindrical and have longitudinal flats extending therealong to facilitate setscrew fastening to a respective tool holder. The longitudinal flats present two problems. First, incorporating longitudinal flats along a boring bar yields less tool rigidity. The longitudinal flats require a loss in cross-sectional area and beam strength. Second, setscrews do not always squarely engage the longitudinal flats of the boring bar despite being tightly fastened down. In other words, the boring bar can be clocked such that the flat become out of square with the set screws wherein the boring bar can work loose from engagement with the set screws during machine operations. Third, setscrews only engage a small area of the boring bar roughly equal to the diameter of the point of the setscrew. The above problems manifest themselves in the form of unnecessarily compromised rigidity of the boring bar tool setup, and an attendant decrease in workpiece quality and/or increase in machining time and cost.

BRIEF SUMMARY OF THE INVENTION

According to one embodiment of the present invention, there is provided a cutting tool apparatus having a shank and a tool support extension disposed longitudinally adjacent the shank and extending in a direction distal the shank, wherein the tool support extension includes an incurvate taper profile.

BRIEF DESCRIPTION OF THE DRAWINGS

Features and advantages of the present invention will become apparent to those skilled in the art from the following description with reference to the drawings, in which.

DETAILED DESCRIPTION OF THE INVENTION

Figure 1:
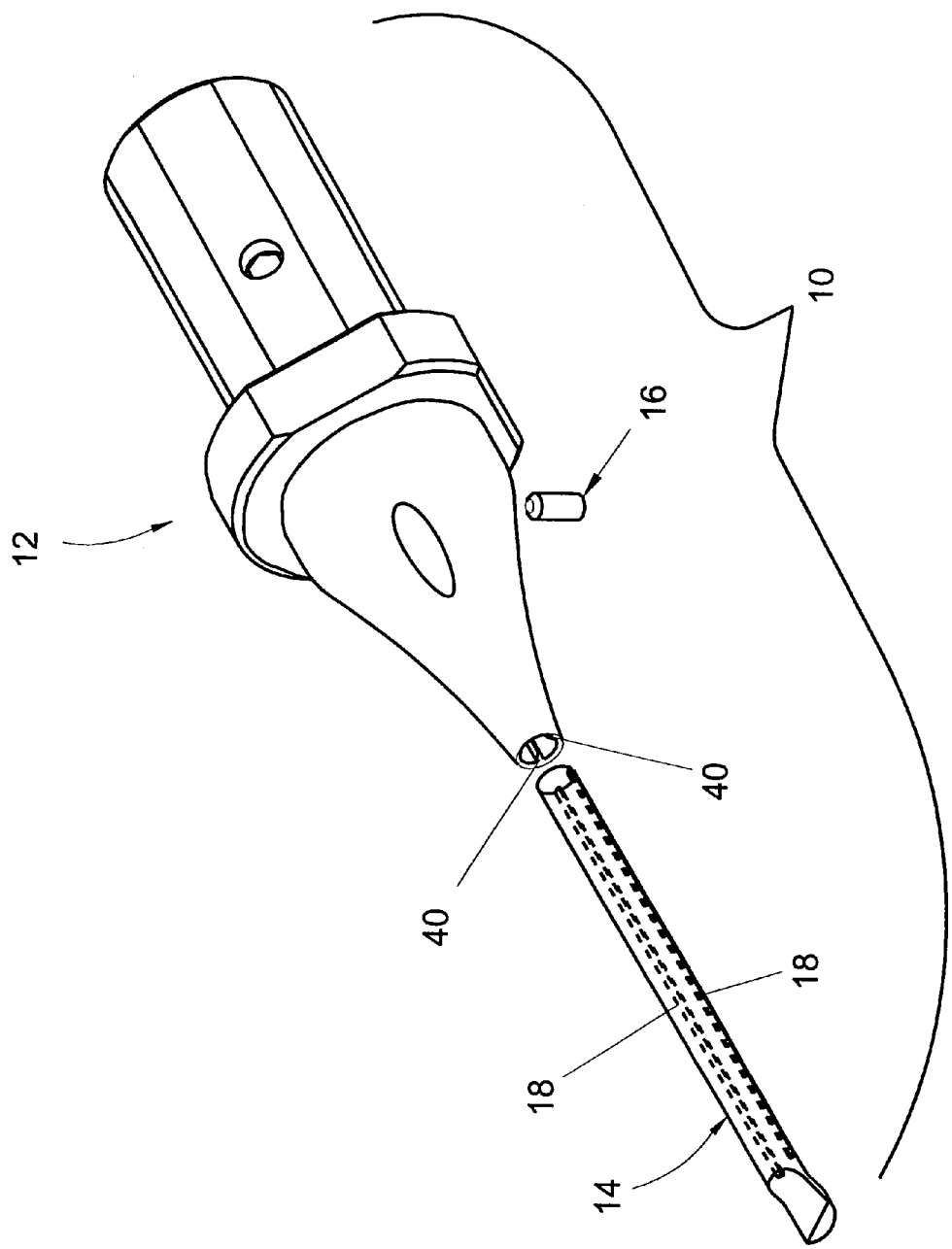
FIG. 1 is an exploded perspective view of a tooling apparatus according to a first embodiment of the present invention.

The present invention is not limited in its application to the details of any particular arrangement described or shown, since the present invention is capable of multitudes of embodiments without departing from the spirit and scope of the present invention. First, the principles of the present invention are described by referring to only a few exemplary embodiments for simplicity and illustrative purposes. Although only a limited number of embodiments of the invention are particularly disclosed herein, one of ordinary skill in the art would readily recognize that the same principles are equally applicable to, and can be implemented in types of tooling. Furthermore, numerous specific details are set forth below and in the drawing figures to convey with reasonable clarity the inventor's possession of the present invention, descriptions of how to make and/or use the present invention, and the best mode in carrying out the present invention known to the inventor's at the time of application. It will, however, be apparent to one of ordinary skill in the art that the present invention may be practiced without limitation to these specific details. In other instances, well known methods and structures have not been described in detail so as not to unnecessarily obscure the present invention. Finally, the terminology used herein is for the purpose of description and not of limitation. Thus, the following detailed description is not to be taken in a limiting sense and the scope of the present invention is defined by the claims and their equivalents.

Generally shown in the Figures, a tool apparatus is presented in accordance with the present invention. The phrase took apparatus means tooling assemblies, tool holders, tool bars, cutting tool inserts, and the like. The phrase tool holder means any device or article for holding another tool apparatus and is synonymous with tool bushing, collet, collar, sleeve, and the like. Finally, the various embodiments described below share many common features and characteristics that need not be discussed for each and every embodiment to avoid unnecessary repetition.

Referring now in detail to the Figures of the present invention, there is shown in FIG. 1 an exploded view of a tooling assembly 10 that generally includes a tool holder 12, a cutting tool such as a boring bar 14, and a set screw 16 for fastening the boring bar 14 within the tool holder 12.

Referring now to FIGS. 2A and 2B, the boring bar 14 ca be composed of any suitable material for machining, including high speed steel, carbide, and the like. For example the bording bar 14 can be a ⅜" diameter bar available from CARBOLOY, part number A06-SCLPR2. As best shown in FIG. 2B, the boring bar 14 includes a longitudinal female dovetail grooves or features 18 for interlocking engagement into the tool holder 12 as will be described further below. As defined herein, dovetail features encompass any substantially longitudinally disposed interlocking features such as dovetails, splines, keyways, and the like. The dovetail features 18 can be integrally formed in the boring bar 14 during manufacture thereof. Otherwise, the dovetail feature 18 can be milled into the boring bar 14 as an independent operation subsequent to creation of the boring bar 14 itself, such as with a 0.370" radius dovetail cutter. It is contemplated that the boring bar 14 can be used without a cutting insert (not shown) or can be adapted to use with a cutting insert. Tools other than a boring bar 14 could be substituted for use in the present invention such as a drill, reamer, end mill, and the like.

Figure 3:
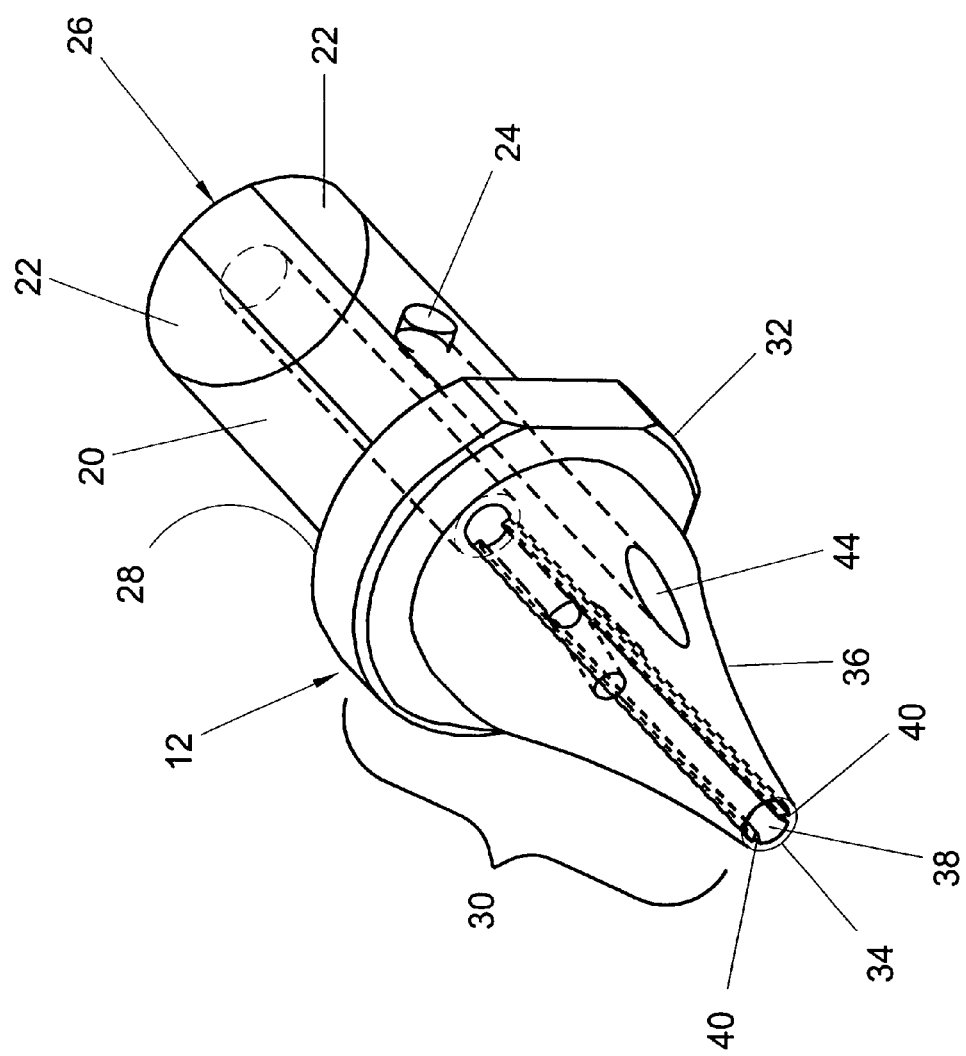
FIG. 3 is a perspective view of a tool holder of the tooling assembly of FIG. 1.

In reference to FIG. 3, the tool holder 12 can be composed of any material suitable for machining including high-speed steel. The tool holder 12 includes a shank 20 that is generally cylindrical in shape and that has one or more longitudinal flats 22 for a setscrew fastening arrangement with a machine tool (not shown). The shank 20 also includes a coolant inlet 24 that is transversely drilled therein. The shank 20 extends longitudinally forward from a rearwardly disposed mounting end 26 and terminates at a locating shoulder 28.

Figure 4:
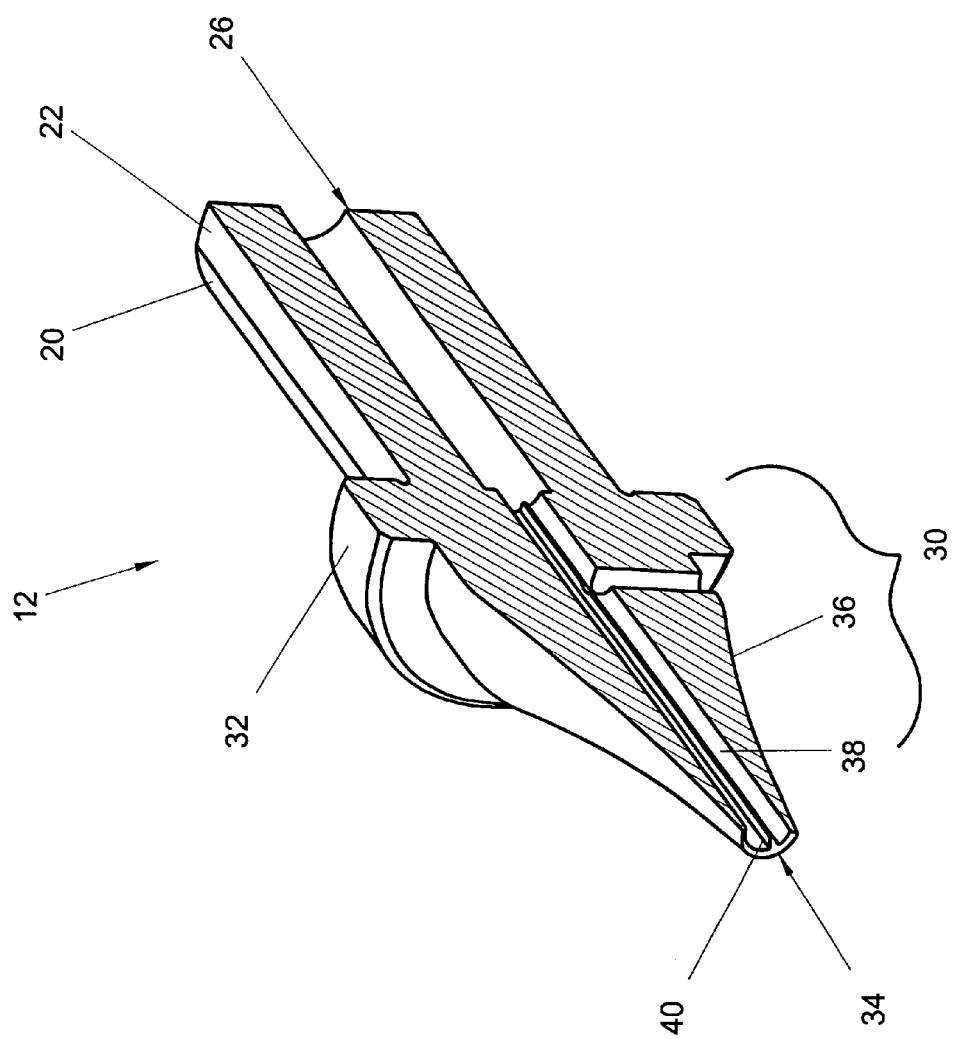
FIG. 4 is a longitudinal cross-sectional view of the tool holder of FIG. 3.

Referring now to FIGS. 3 and 4, a tool support extension 30 originates longitudinally adjacent the shank 20, includes a mounting flange 32, and is cantilevered from the shank 20 when the shank 20 is held by a machine tool. As such, the tool support extension 30 is typically a cantilevered beam that is used to support the boring 14 of FIG. 2. As shown in FIG. 3, the tool support extension 30 is integral with the shank 20 as opposed to being a separate part, as will be described with respect to FIG. 15 below. One of ordinary skill in the art will recognize that the locating shoulder 28 and flange portion 32 are not necessary to the present invention, such that the novel aspects of the tool support extension 30 of the present invention could be incorporated in a flangeless tool or tool holder. Here, the tool support extension 30 of all of the embodiments is inclusive of structure that is forward of and adjacent the shank 20. The tool support extension 30 extends forward from a position longitudinally adjacent the shank 20 and terminates in a forward tool end 34—specifically shown here in the shape of a frusto-conical tip.

The tool support extension 30 is shaped as a substantially circumferentially full cone or taper that reduces along a direction toward the forward tool end 34. In other words, the tool support extension 30 is declivitive in a forward extending direction to define a declivitive profile 36. The declivitive profile 36 of the tool support extension 30 can be excurvate/convex, straight, incurvate/concave, or any other geometry designed for workpiece clearance. As shown here, the declivitive profile 36 is incurvate in shape, which is conducive to optimum workpiece clearance during machining operations. In other words, the tool support extension 30 includes unique tool geometry for reaching deeply into a workpiece (not shown) with minimal tooling interference with the workpiece. Accordingly, the tool support extension 30 maximizes extended tool support while it minimizes tool holder mass, thereby yielding an optimal tight-spaced tool solution such as for boring of stepped diameter workpieces. It is contemplated that portions of the tool support extension 30, particularly those portions nearest the forward tool end 34, can be relieved for additional workpiece clearance. Such relief can be machined into the tool support extension 30 or can be a void formed in the tool support extension during manufacturing thereof.

The tool holder 12 further includes a tool bore 38 extending centrically, or on-center, therethrough. The tool holder 12 includes a male dove-tail feature 40 that longitudinally extends along the tool bore 38 for engagement with the female dove-tail feature 18 of the boring bar 14 of FIG. 2. It is contemplated that the male dovetail feature 40 could be provided on the boring bar 14 instead of the tool holder 12, and vice-versa. The male dovetail feature 40 of the tool holder 12 can be machined therein, for example with a broaching tool or the like. Referring to FIG. 4, a setscrew hole 42 extends transversely through a portion of the tool support extension 30 to accept the setscrew 16 shown in FIG. 1.

Referring back to FIG. 1, the setscrew 16 is aligned squarely to the mating surfaces of the respective dovetail features 18 and 40 of the boring bar 14 and tool support extension 30. Additionally setscrews and holes could be provided in various longitudinal locations along the tool support extension 30 for additional holding power of the boring bar 14 within the tool holder 12. A coolant outlet 44 is drilled longitudinally through the tool holder 12 to intersect with the transversely drilled coolant inlet hole 24. As is apparent from FIG. 3, the unique tool support extension enables the coolant outlet hole 44 to be positioned much closer to a workpiece compared to prior art tool holder designs.

Figure 5:
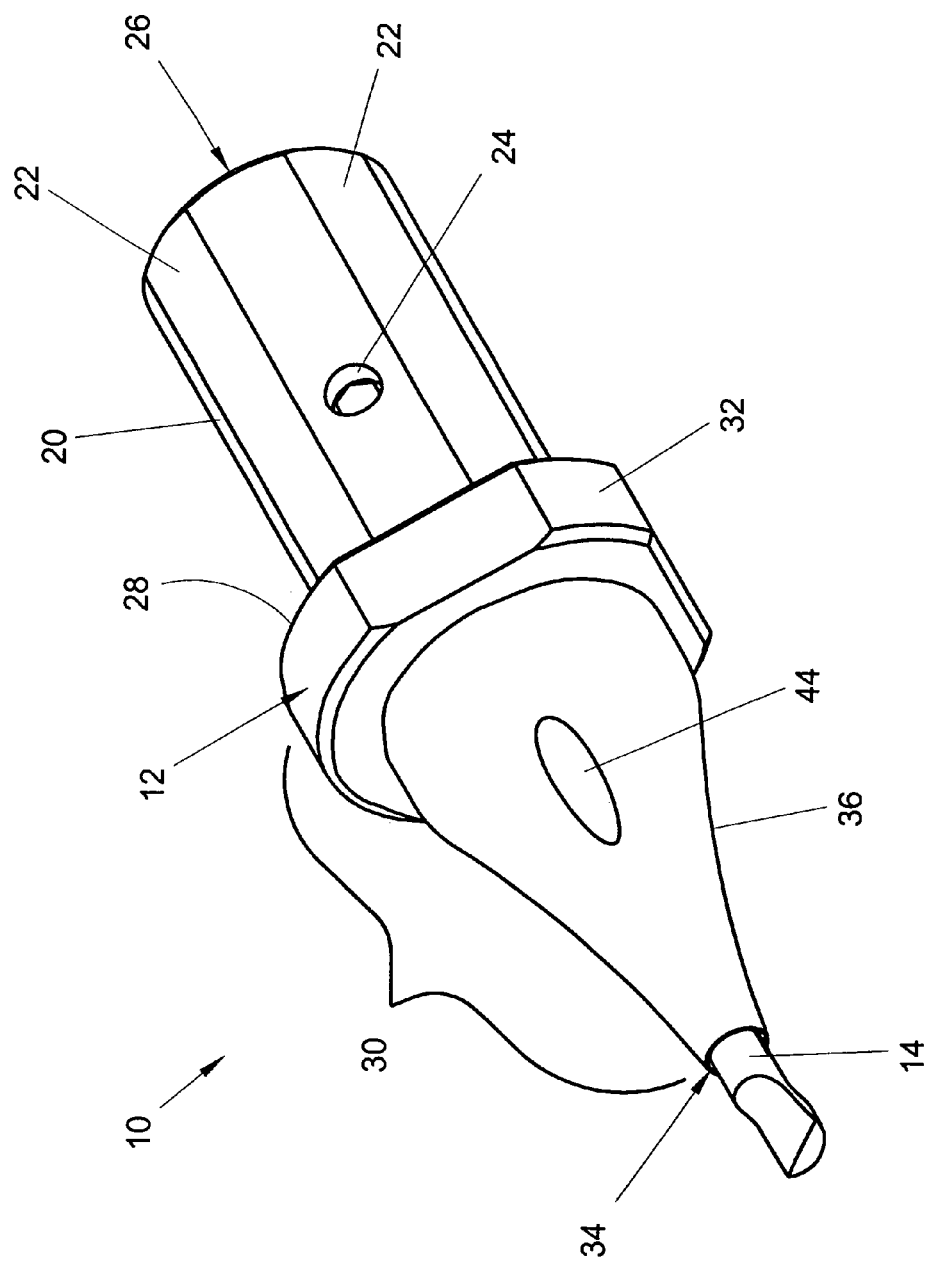
FIG. 5 is a perspective view of the tooling apparatus of FIG. 1, as assembled.

As shown in FIG. 5, the boring bar 14 inserts longitudinally into the tool holder 12, and the set screw 16 of FIG. 1 threads into the tool holder 12 to fasten the boring bar 14 within the tool holder 12 to yield the tooling assembly 10 of the present invention. As such, the boring bar 14 can be positioned as shown within the tool support extension 30 for increased tool rigidity, or the boring bar 14 can be extended longitudinally forward form the shown position for increased tool reach and workpiece clearance. In any case, such a tooling assembly 10 is typically used with a turning center machine tool (not shown) wherein the mounting end 26 of the tool holder 12 is inserted into a tailstock or tool spindle of the machine tool.

Referring again to FIG. 1, the present invention provides a tool holding structure that is substantially more rigid than that of existing tool holders. The present invention provides a novel and unobvious tool support extension 30 that is relatively long, slender, and uniquely shaped for entering the interior of a workpiece during a cut under minimal workpiece interference. The unique incurvate shape of the tool support extension 30 permits optimal tool support and reach while ensuring optimized clearance between the tool holder 12 and a workpiece.

The present invention also provides a unique and substantially more rigid interconnection of a substantially cylindrical boring bar 14 to a tool holder 12. To begin with, the longitudinal dovetail features 18, rather than longitudinal flats, yield a boring a bar with relatively more substantive cross-sectional area and thus greater beam strength and rigidity. This is because longitudinal dovetail features require relatively little of the circular cross section of the boring bar 14 to be removed. In contrast, using longitudinal flats generally requires relatively more material to be removed from the boring bar 14. Moreover, the dovetail features 18 provide close interlocking engagement over a greater length of the boring bar 14 compared to prior art designs. For example, with setscrew and longitudinal flat designs, the engagement area is limited only to where the setscrew engages the flat of the boring bar (nor shown). In other words, the present invention provides a more continuous engagement area between the boring bar 14 and tool holder 12, whereas prior art designs provide only a very discrete amount of engagement area.

Additionally, dovetail engagement of a cylindrical tool within a tool holder bore solve the clocked boring bar/jammed setscrew condition described in the background section. Use of closely mating dovetail features 18, as with the present invention, precludes the possibility that the boring bar 14 becomes clocked within the tool holder 12, thereby minimizing the possibility that the boring bar 14 could work itself loose under vibrations during machining.

Figure 6:
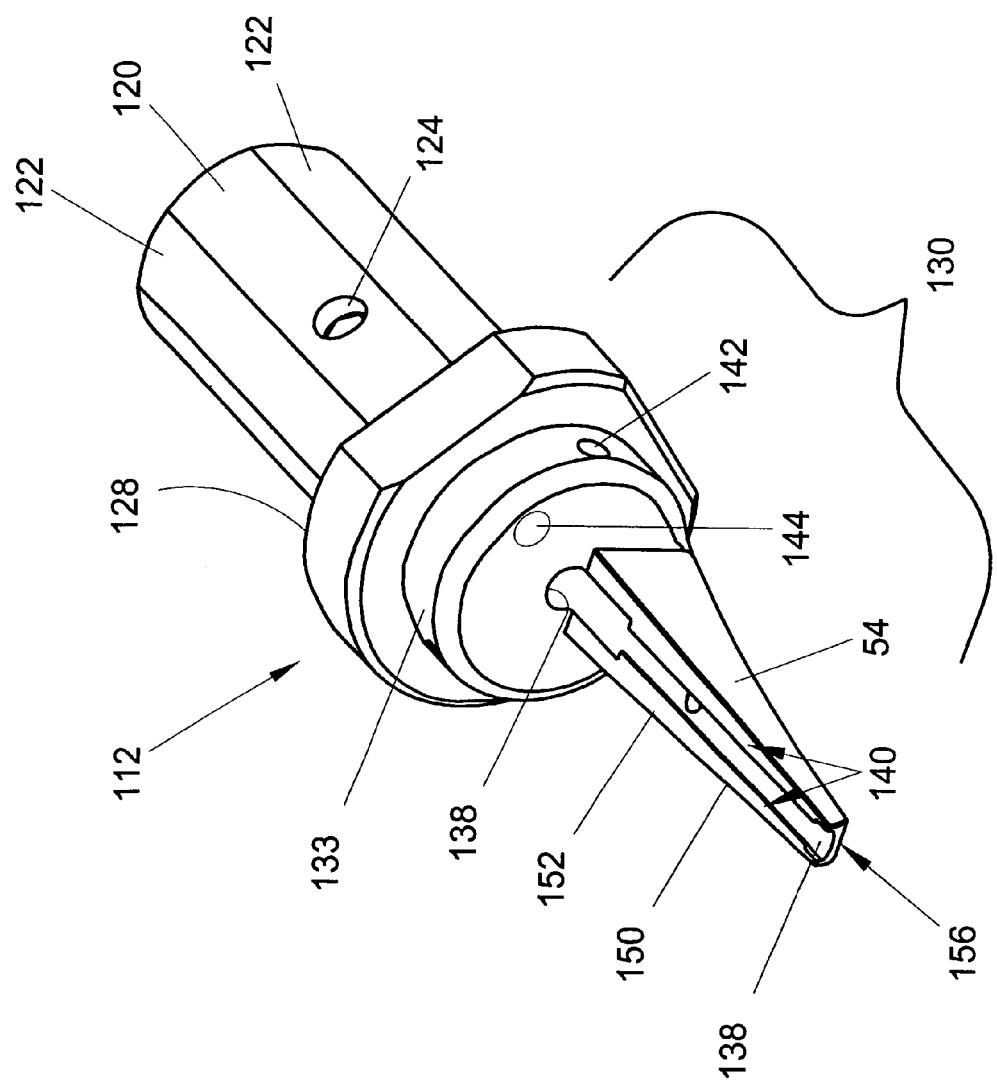
FIG. 6 is a perspective view of a tool holder according to a second embodiment of the present invention.
Figure 7:
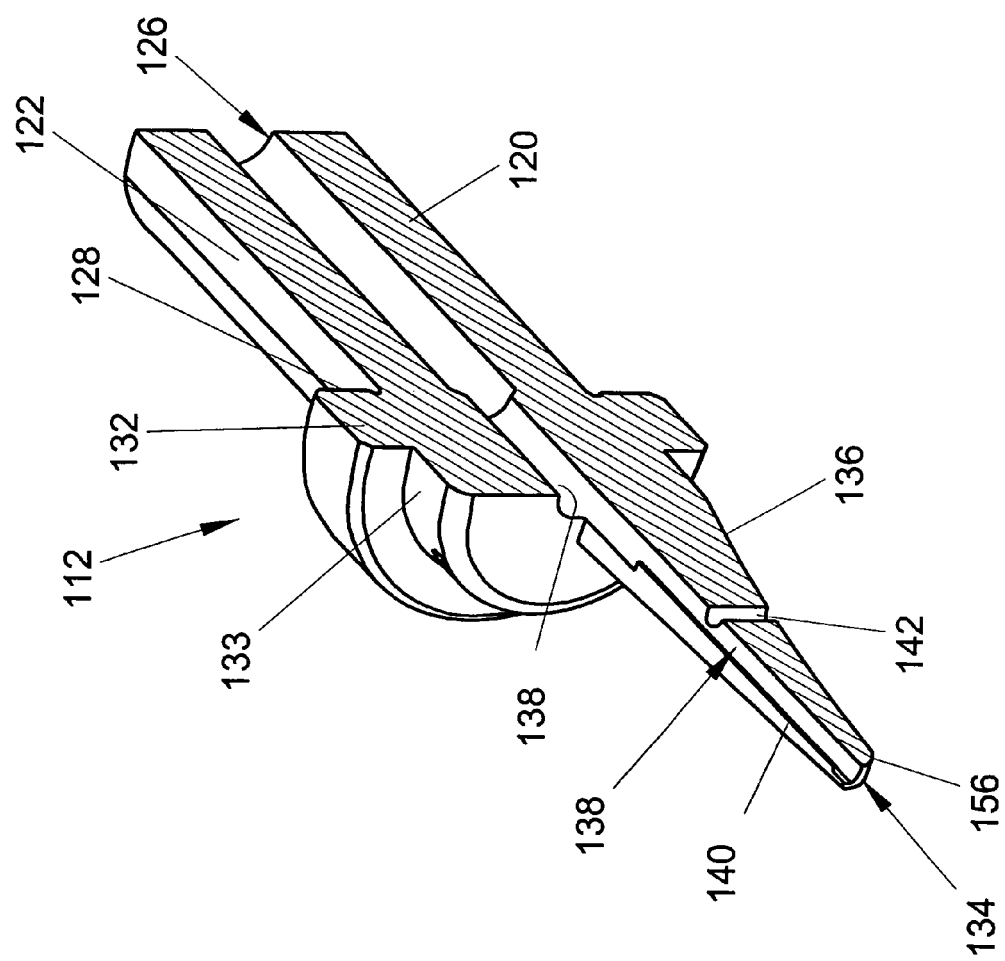
FIG. 7 is a longitudinal cross-sectional view of the tool holder of FIG. 6.
Figure 8:
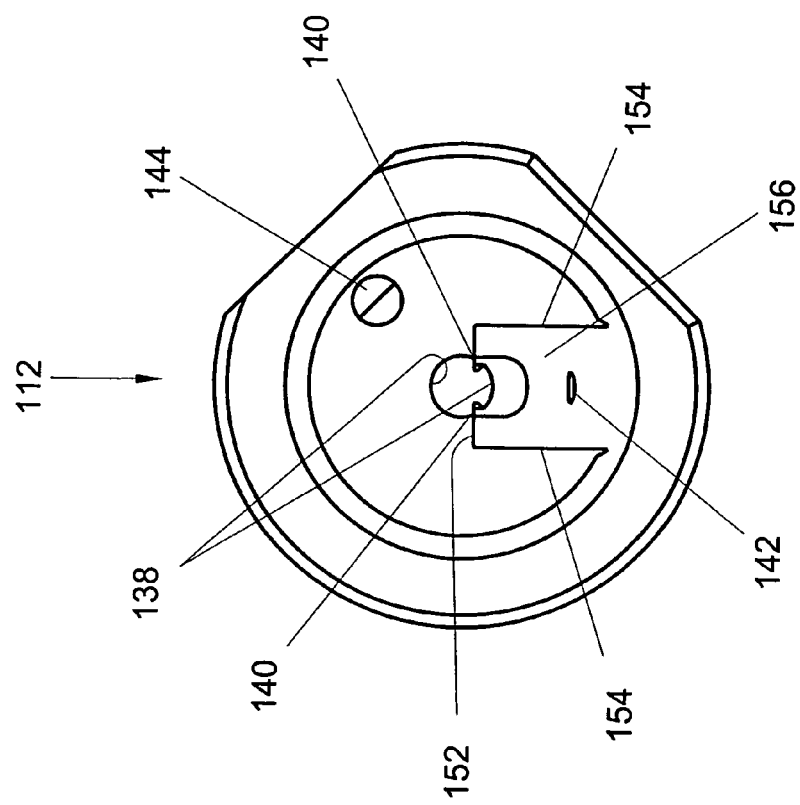
FIG. 8 is a forward end view of the tool holder of FIG. 6.

FIGS. 6 through 8 illustrate a tool holder 112 in accordance with another embodiment of the present invention. This tool holder 112 is largely consistent with the embodiment described above with a few exceptions. As best shown in FIG. 6, the tool holder 112 includes a shank 120 with flats 122 and a coolant inlet 124 wherein the shank 120 terminates at a locating shoulder 128. Longitudinally adjacent the shank 112 is a tool support extension 130 including a mounting flange 132 and setscrew diameter 133 having a threaded setscrew hole 142. Again, a coolant outlet 144 is provided, but here the coolant outlet 144 is not positioned at an extended forward location as with the previous embodiment.

Figure 2:
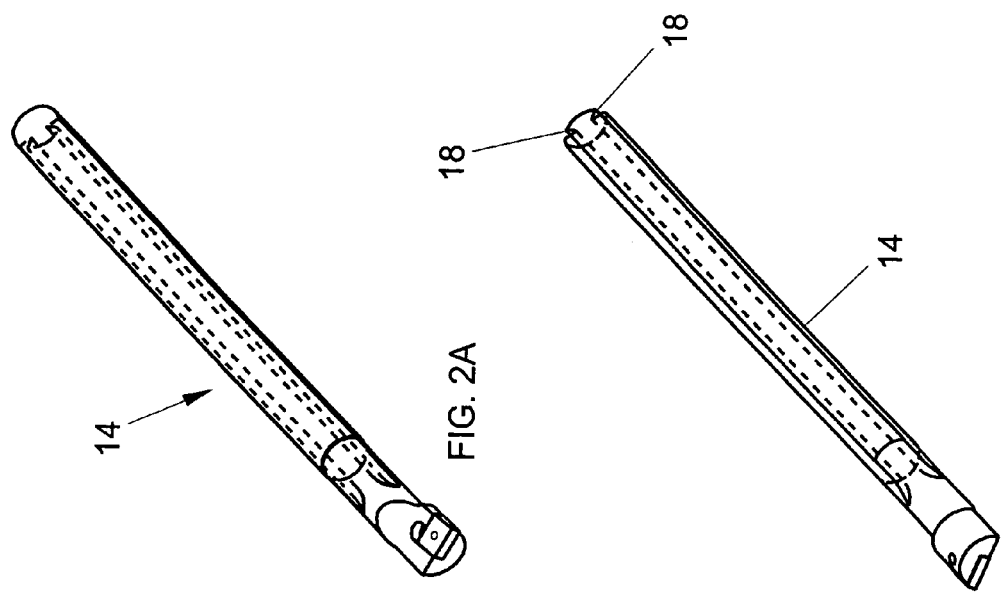
FIG. 2A is a perspective view of a carbide boring bar of the tooling assembly of FIG. 1.
FIG. 2B is a perspective view of the underside of the carbide boring bar of FIG. 2A.

As best shown in the front-end view of FIG. 8, the tool holder 112 includes the tool support extension 130 having a sector extension 150 that is uniquely shaped for supporting the boring bar 14 of FIG. 2 within and on the tool holder 112. Under the circumferentially full tool support extension 30 of FIG. 3 of the previous embodiment, this tool support extension 130 includes the sector extension 150 that is sector-shaped such that the sector extension 150 occupies only a partial radian range of the circumference of the tool holder 112, as best shown, the end view of FIG. 8. A sector is sometimes defined as a portion of a circle that is bounded by two radii and an arc joining the end points of the two radii. Here, however, sector is more broadly defined as any portion of a circle that is less than a full circle, such that the boundaries need not consist of radii and an arc. Rather, under the definition of sector according to the present invention, the boundaries can be lines and the like that do not pass through the center of a circle, as shown in FIG. 8. The sector extension 150 of FIG. 8 occupies only about a 45° wide sector of the circumference of the tool holder 112. The sector 15° could vary in size from as little as 1° up the 360° fully circumferential tool support extension of the previous embodiment. The sector extension 150 has a flat top 152 and sides 154, with an incurvately underside 156 for workpiece clearance.

As best shown in FIG. 7, the tool holder 112 includes a shank 120 that is generally cylindrical in shape and that has one or more longitudinal flats 122. The shank 20 extends longitudinally forward from a rearwardly disposed mounting end 126 and terminates at a locating shoulder 128. A tool bore 138 is provided along and through the tool support extension 130. Along the sector extension 150, the tool bore 138 is circumferentially open. As such, the tool bore 138 is defined herein as encompassing both an open portion and a circumferentially enclosed portion. The tool support extension 130 includes male dove-tail tongues or features 140 that longitudinally extent along the tool bore 138 for interlocking engagement with the female dove-tail features 18 of the boring bar 14 of FIG. 2, as also shown in the cross-sectional view of FIG. 7. The tool bore 138 is provided along a central longitudinal axis of the tool holder 112 such that the tool bore 138 is centrically positioned, or on-center with respect to the tool holding 112. Again, the dovetail feature 140 can be machined into the tool holder 112 by broaching, by milling, or the like. A setscrew hole 142, (or a series of set screw holes) can be provided anywhere along the length of the tool support extension 130. Thus, additionally setscrews can be fastened into the tool holder 112 for extra tool support and rigidity.

Figure 9:
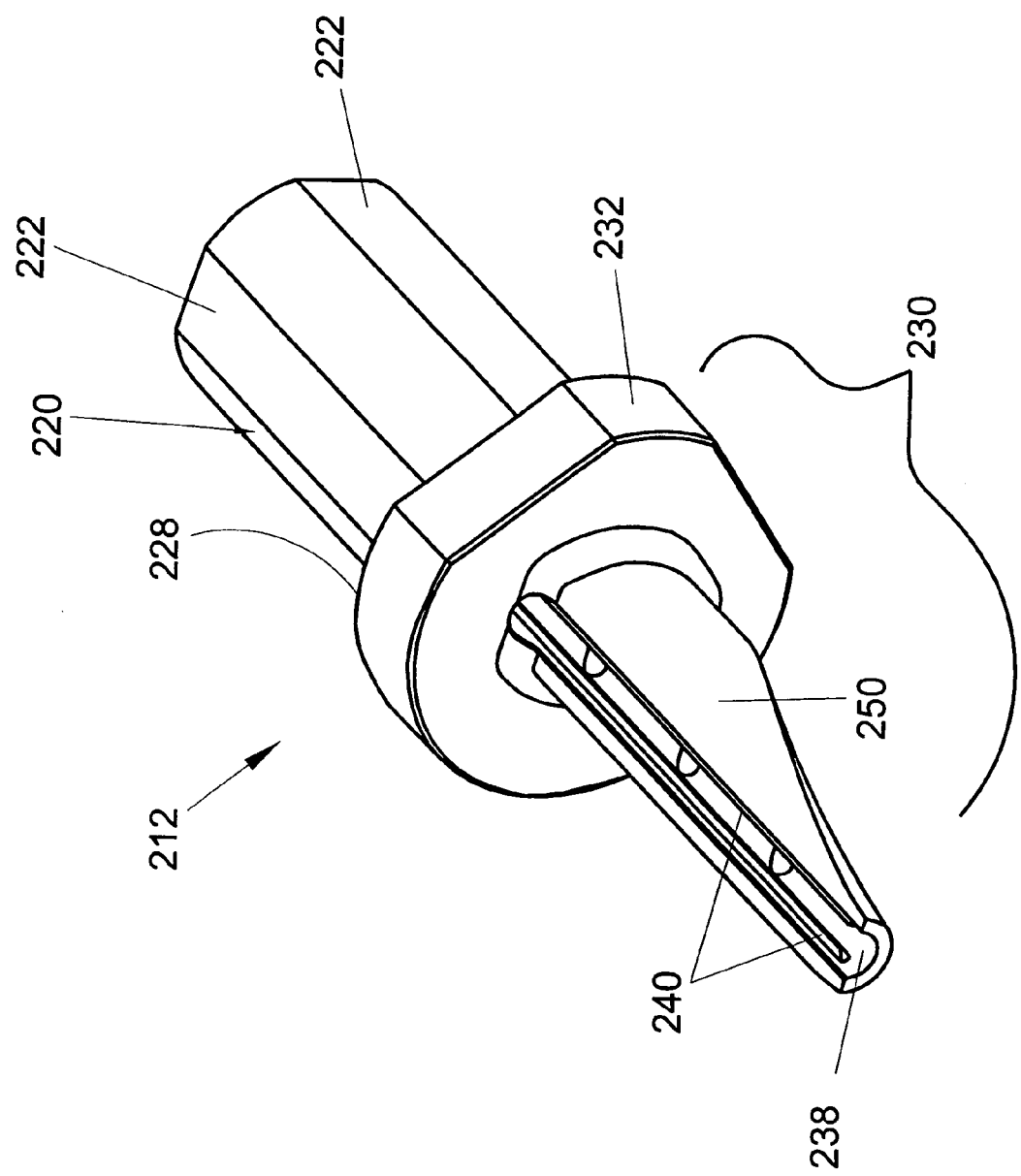
FIG. 9 is a perspective view of a tool holder according to a third embodiment of the present invention.
Figure 10:
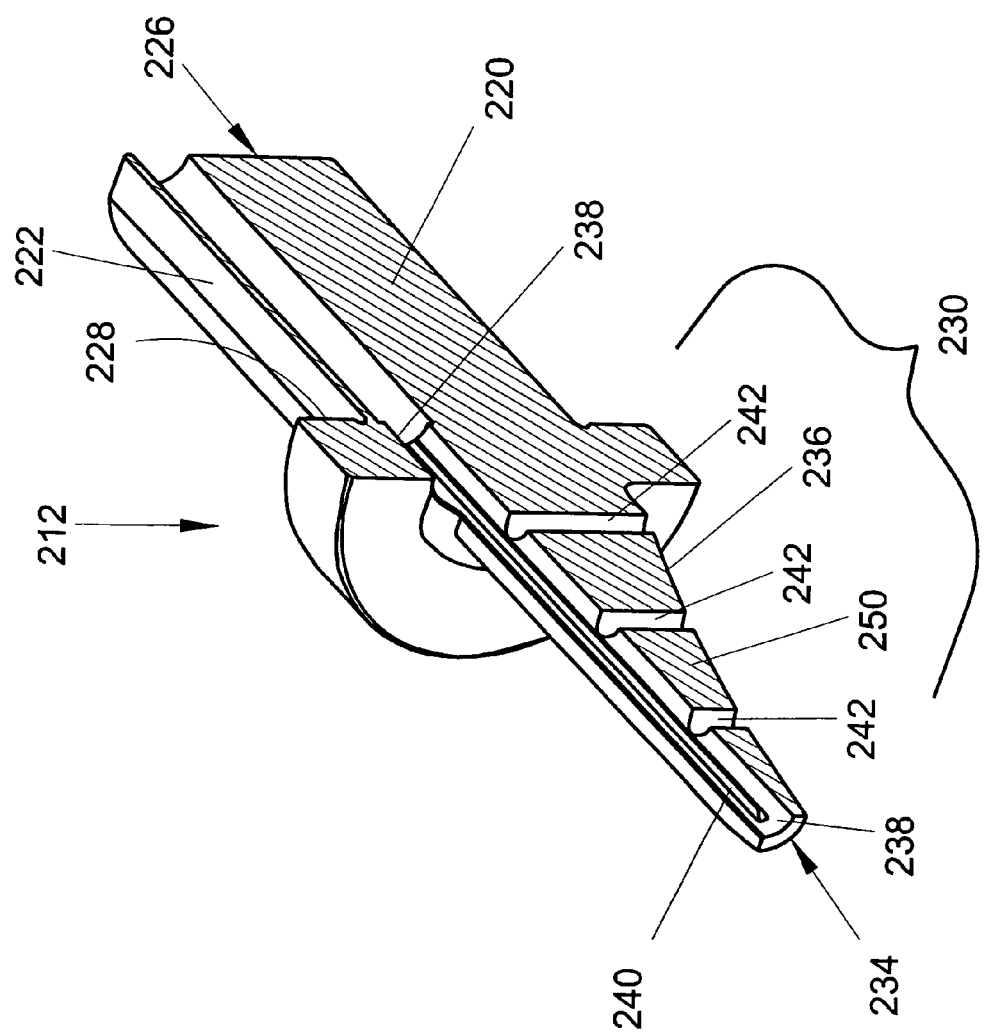
FIG. 10 is a longitudinal cross-sectional view of the tool holder of FIG. 9.
Figure 11:
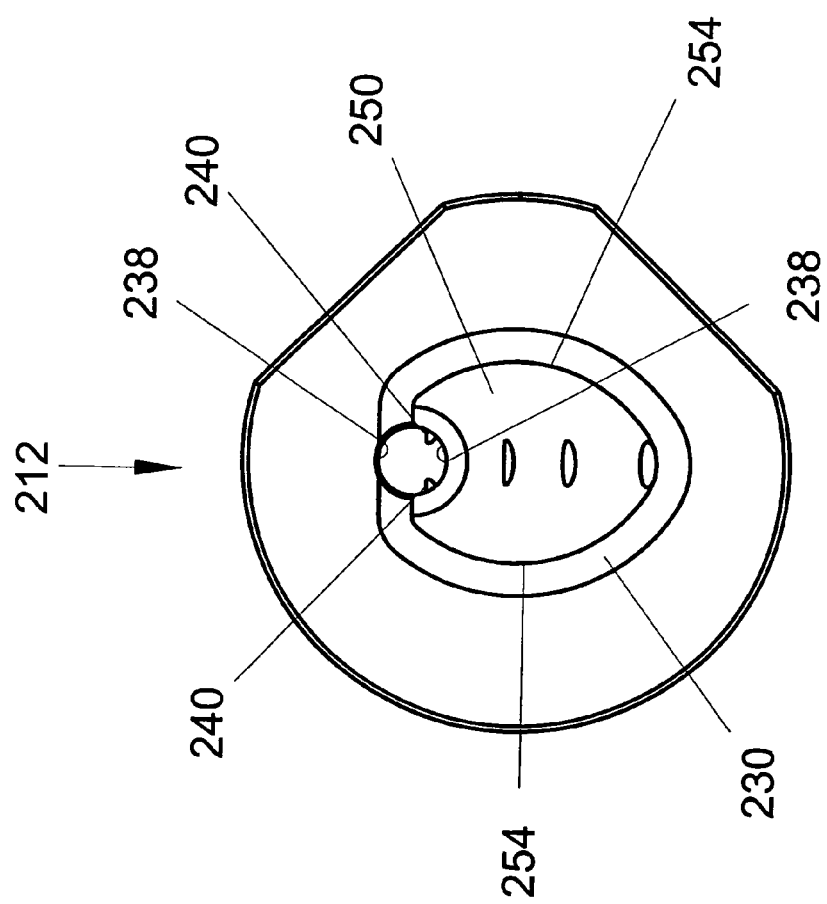
FIG. 11 is a forward end view of the tool holder of FIG. 9.
Figure 11A:
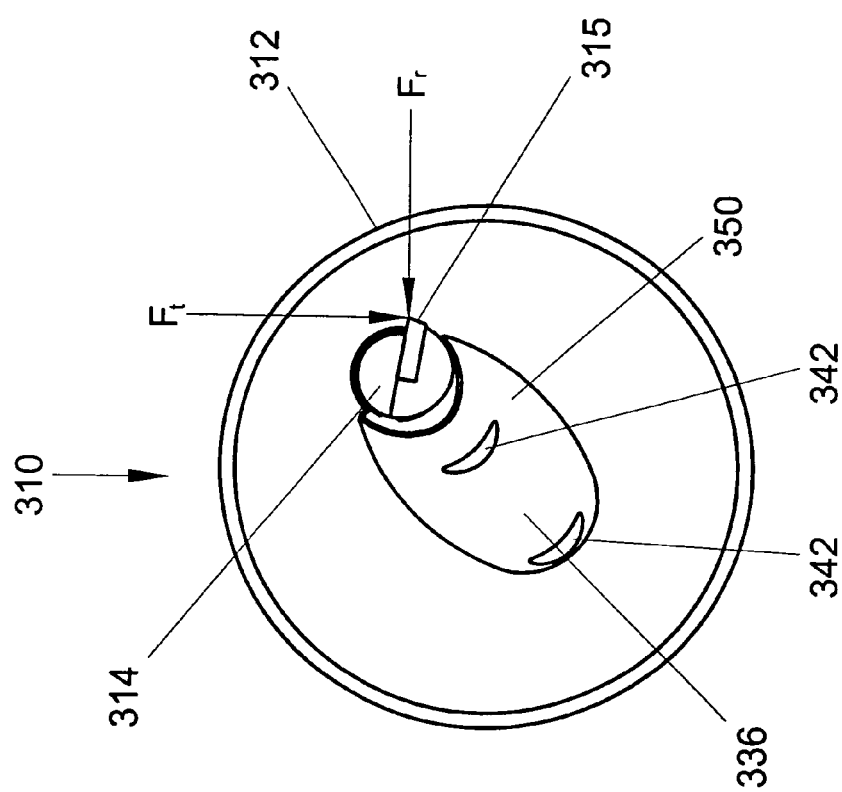
FIG. 11A is a forward end view of a tool holder according to a fourth embodiment of the present invention.
Figure 12:
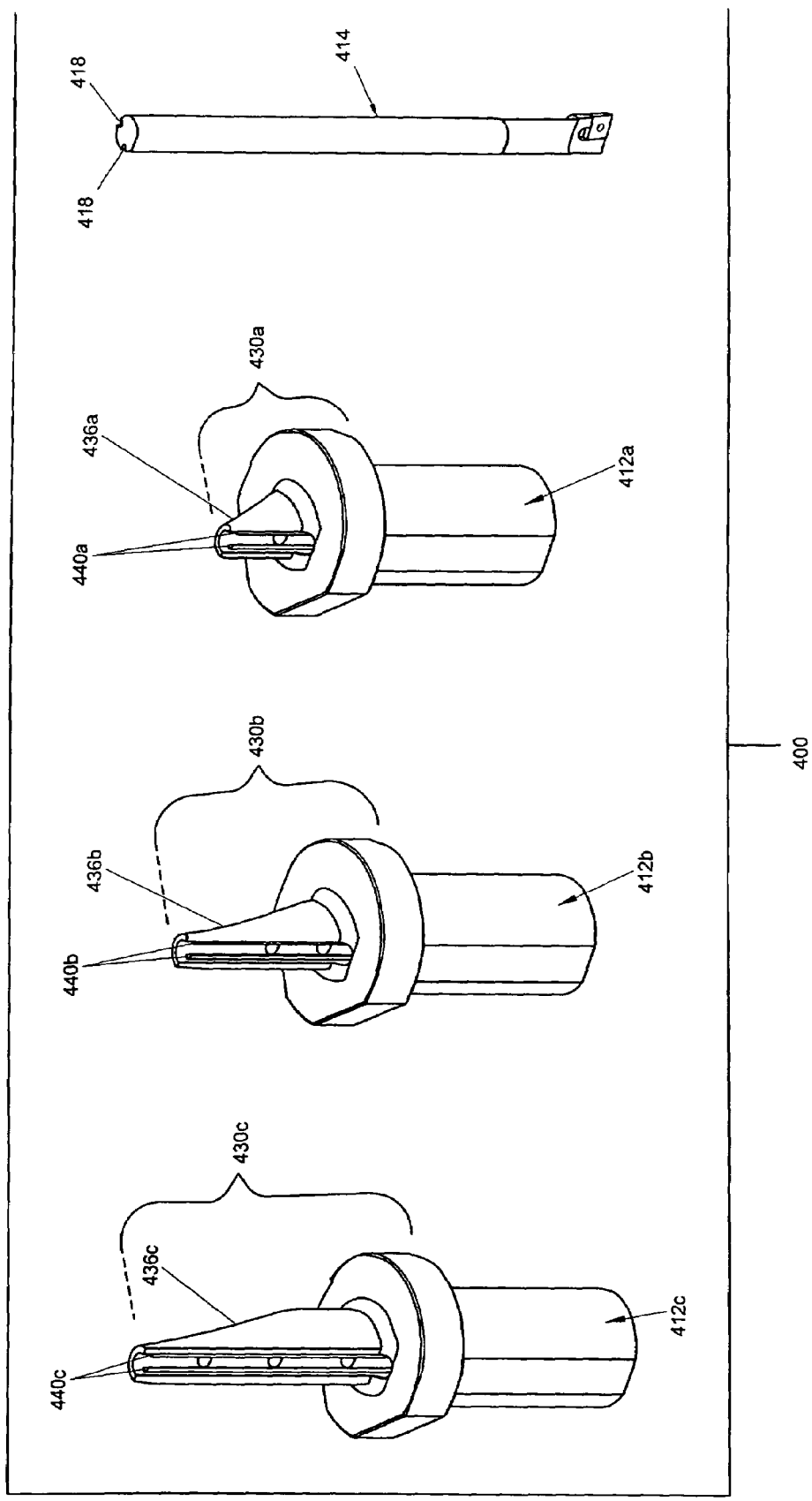
FIG. 12 is a perspective view of a tooling kit according to a fifth embodiment of the present invention.

Another embodiment of the present invention includes a tool holder 212 as shown in FIGS. 9 through 11. As shown in FIGS. 9 and 10, the tool holder 212 is substantially similar to the previously described embodiment with the exception that a tool bore 238 is redially offset from the central longitudinal axis of the tool holder 212 such that the tool bore 238 is not on-center. In other words, the tool bore 238 is eccentrically positioned. This unique geometry provides additional tool holder mass and beam strength to support the boring bar 14 of FIG. 2.

As with the previous embodiment, the tool holder 212 includes a shank 220 that is generally cylindrical in shape and that has one or more longitudinal flats 222. The shank 220 extends longitudinally forward from a rearwardly disposed mounting end 226 and terminates in a locating shoulder 228. A tool support extension 230 is integral with the shank 220 and originates longitudinally adjacent the shank 220, includes a mounting flange 232, and is cantilevered from the shank 220 when the shank 220 is held by a machine tool. The tool support extension 230 includes a sector extension 250 having a declivitive profile 236 that is incurvately tapered for workpiece clearance, as best illustrated in FIG. 10. As best shown in FIG. 11, the tool support extension 230 includes sides 254 that are not straight ads with the previous embodiment, but rather are curved such that the tool support extension 230 is substantially elliptical in cross-sectional shape.

FIG. 1 illustrates a front-end view of a tooling assembly 310 that incorporates a boring bar 314 into a tool holder 312 wherein the tool holder 312 is a slight variation on the embodiment of FIGS. 9 through 11. In contrast to the vertically oriented sector extension 250 depicted in FIG. 11, here a sector extension 350 is oriented obliquely with respect to vertical. In transverse cross-section, the sector extension 350 can take any shape including elliptical, semi-elliptical, and the like. As with the other embodiments, the sector extension 350 includes a declivitive profile 336 that is incurvately shaped for workpiece clearance.

The sector extension 350 is strategically oriented at about a 45° angle from vertical so as to squarely oppose resultant cutting forces acting on a cutting insert 315 of the boring bar 314. The resultant cutting forces arise from the vertical or tangential cutting forces $F_T$ due to rotation of the workpiece (not shown) into the cutting insert 315, and from the horizontal or radial cutting forces $F_R$ due to the feed of the cutting insert 315 into the workpiece. Thus, the mass of the sector extension 350 can be further minimized for better workpiece clearance, by calculating the resultant cutting force magnitude and direction and threreby predetermining the optimum angle and size for the oblique sector extension 350.

Another embodiment of the present invention involves a tooling kit 400. The kit 400 includes a relatively small diameter boring bar 414 of ¼" diameter for example, and several different tool holders 412a-412c of varying proportion but common tool bore diameter, and according to the inventive features of the present invention. As shown, the kit 400 includes the three tool holders 412a-412c distinguished by the proportion of the length (L) of each tool support extension 430a-430c to the diameter (D) of each respective shank 420a-420c. Here, the tool holders 412a-412c have L:D ratios including 1:1, 1:2, and 1:3 respectively.

The kit 414 includes the features of the above-described embodiments. For example, the boring bar 414 includes the dovetail features 418 for interlocking engagement with each of the tool holders 412a-412c. In turn, each of the tool holders 412a-412c include the inventive features described with respect to the embodiment of FIGS. 9-11. For example, dovetail features 440a-440c are provided in the tool support extensions 430a-430c for interlocking with the boring bar 414. Also, the tool support extensions 430a-430c include a declivitive profiles 436a-436c of incurvate shape for workpiece clearance. The kit 400 can include any quantity and combination of variously sized boring bars and tool holders.

The kit 400 solves an expensive problem for machinists. It is common for a machinist to use several different diameter boring bars to cut different features of a workpiece. This is done to optimize rigidity and machining speed for shallower, larger cuts and provide sufficient tool reach and workpiece clearance for deeper, smaller cuts. However, this practice is relatively expensive since it necessitates keeping several expensive and differently sized boring bars on hand. Alternatively, some machinists make a practice of buying one relatively large boring bar and snag grinding the boring bars for clearance as needed. Such a practice is destructive to the boring bar and results in a rigidity compromised tool.

Using the kit 400, however, a machinist can use the single boring bar 414 to cut a single workpiece and strategically select from the various tool holders 412a-412c that best optimize tool rigidity and workpiece clearance for a particular cut. Such a solution is economical because a machinist need not keep on hand several expensive boring bars of varying diameter. Rather, the machinist need have only one common diameter boring bar and select among several relatively inexpensive tool holders.

This kit solution provides a machinist the flexibility to customize the tooling assembly at the machine tool either by selecting a different proportion tool holder and/or sliding the boring bar in an out of the tool holder for more or less workpiece clearance. There is no need for keeping several expensive boring bars nor for trial and error snag grinding of a single large boring bar. Moreover, a machinist need not cobble or modify an existing tool to achieve workpiece clearance and tool rigidity. Rather, a machinist need only select among various tool holders of different proportion and adjust the length of a boring bar therein to achieve optimal workpiece clearance and tool rigidity.

Figure 13A:
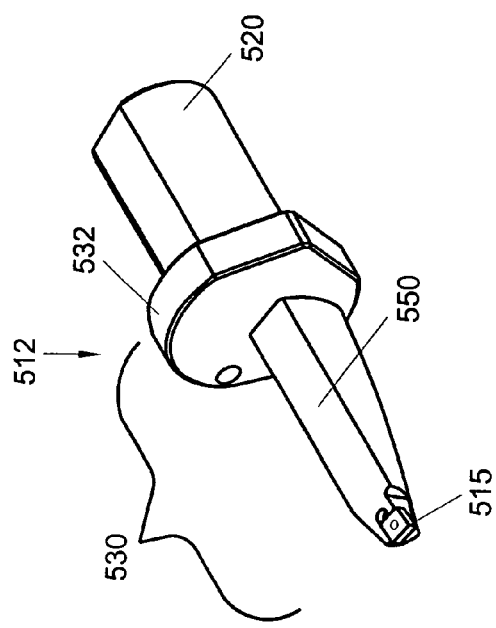
FIG. 13A is a perspective view of a tool apparatus according to a sixth embodiment of the present invention.
Figure 13B:
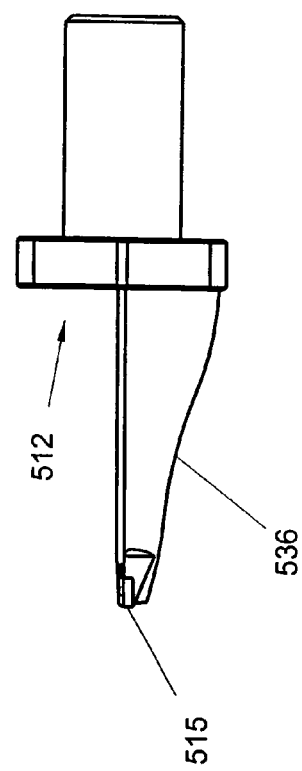
FIG. 13B is a side view of the tool apparatus of FIG. 13A.

FIGS. 13A and 13B illustrate a further embodiment of the present invention wherein it is contemplated that a tool holder 512 of the present invention can hold a cutting insert 515 directly without using an intermediate boring bar (not shown). As illustrated in FIG. 13A, the tool holder 512 includes a shank 520, tool support extension 530, a mounting flange 532, and sector extension 550. As shown in FIG. 13B and like the previously described embodiments, the tool holder 512 includes a declivitive profile 536 having an incurvate tapered shape for optimal workpiece clearance. This tool holder 512 can be used in machining applications where a boring bar is unnecessary or undesired, yet the rigidity and unique clearance geometry of the present invention is needed.

Figure 14A:
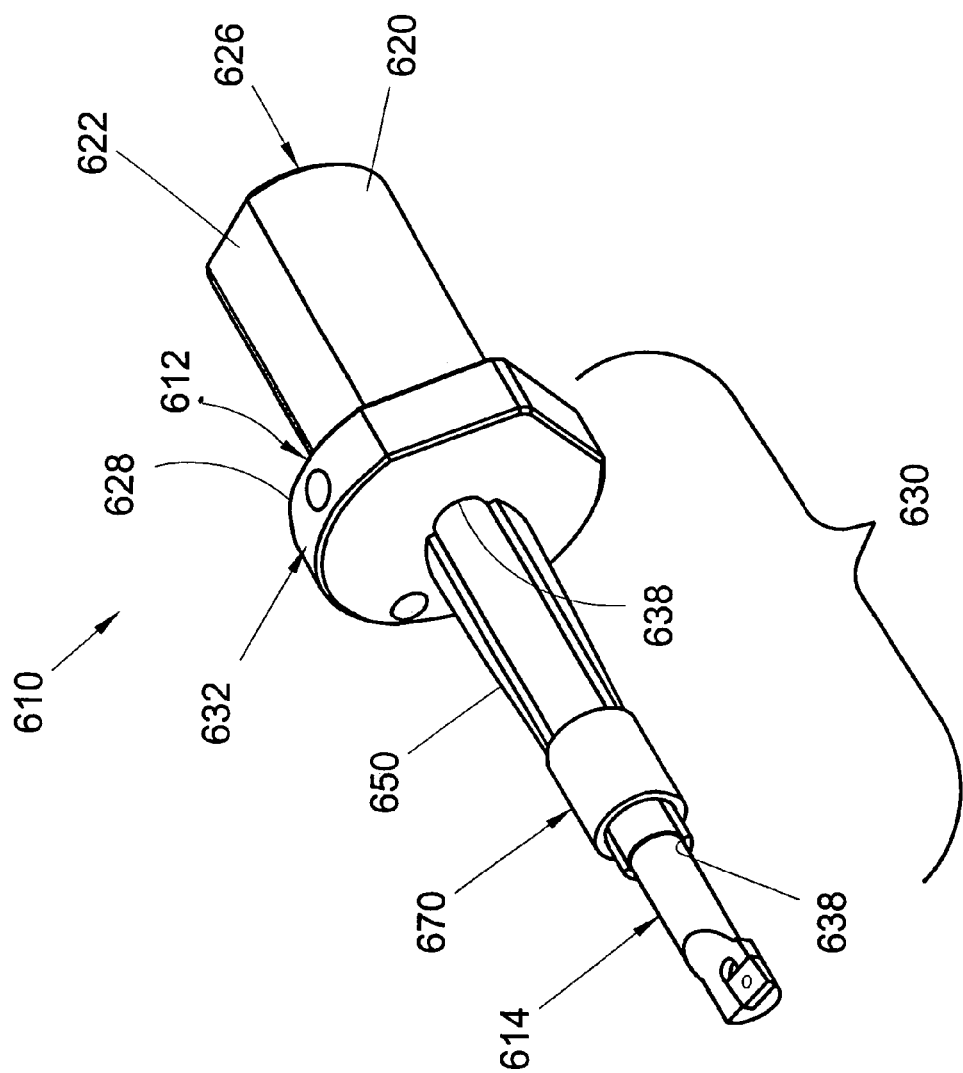
FIG. 14A is a perspective view of a tool apparatus according to a seventh embodiment of the present invention.
Figure 14B:
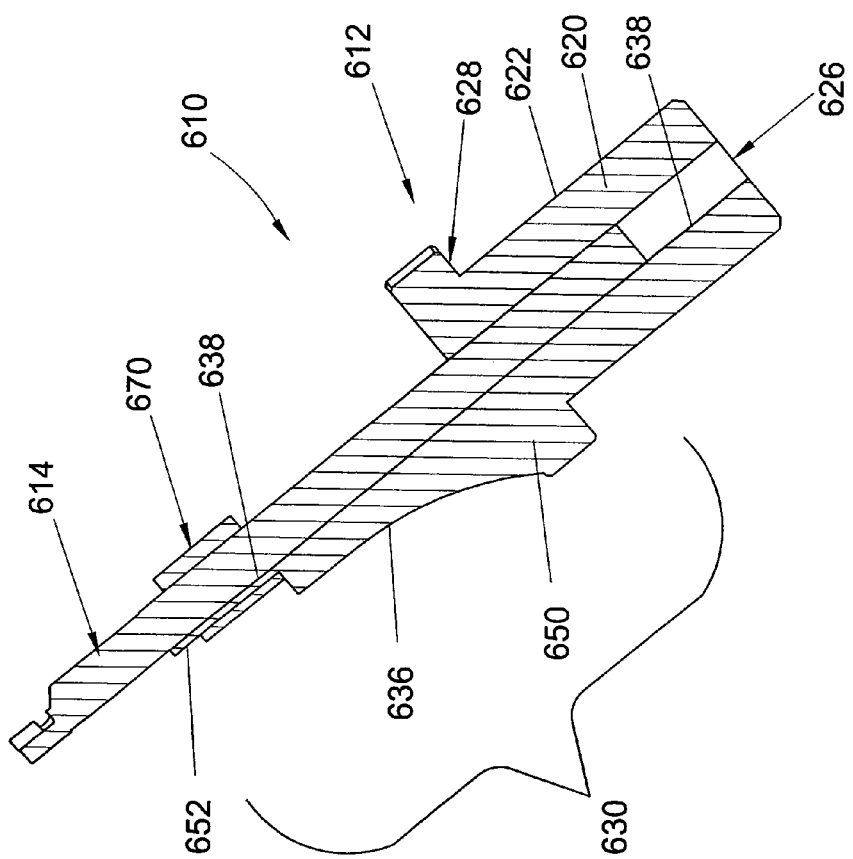
FIG. 14B is a longitudinal cross-sectional view of the tool apparatus of FIG. 14A.

FIGS. 14A and 14B illustrate a tooling assembly 610 according to another embodiment at the present invention. A tool holder 612 includes a shank 620 that is generally cylindrical in shape and that has one or more longitudinal flats 622. The shank 620 extends longitudinally forward from a rearwardly disposed mounting end 626 and terminates at a locating shoulder 628. A tool support extension 630 originates longitudinally adjacent the shank 620 and includes a mounting flange 632.

A boring bar 614 is slidably disposed within a tool bore 638 that is eccentrically positioned with respect to the central longitudinal axis of the tool holder 612. The boring bar 614 is longitudinally adjustable within the tool bore 638 such that the tool reach or overhang can be lengthened or shortened. Unlike the boring bar depicted in the previous embodiments, this boring bar 614 does not include a dove-tail feature. Therefore, this embodiment of the present invention can be used independently of the unique dove-tailed cylindrical boring bar feature and can thus be used with off-the-shelf boring bars.

The boring bar 614 can be fastened to the tool holder solely by set screws or, as shown, the boring bar can be additionally fastened to the sector extension 650 of tool holder 612 by one or more band clamps 670 or similar attachment devices. As shown, the band clamp 670 circumscribes the boring bar 614 and a portion of the sector extension 650 to fasten the boring bar 614 to the tool holder 612.

As best shown in FIG. 14B, the sector extension 650 of the tool support extension 630 tapers forward from shoulder 628 I the form of a declivitive profile 636 of incurvate shape. The sector extension 650 terminates in a fastening extension 652. The band clamp 670 circumscribes the fastening extension 652 and the boring bar 614 to hold the boring bar 614 to the tool support extension 630. The band clamp 614 is contemplated to be a high-strength clamp or ring such as is readily available from the OETIKER Corporation.

Figure 15:
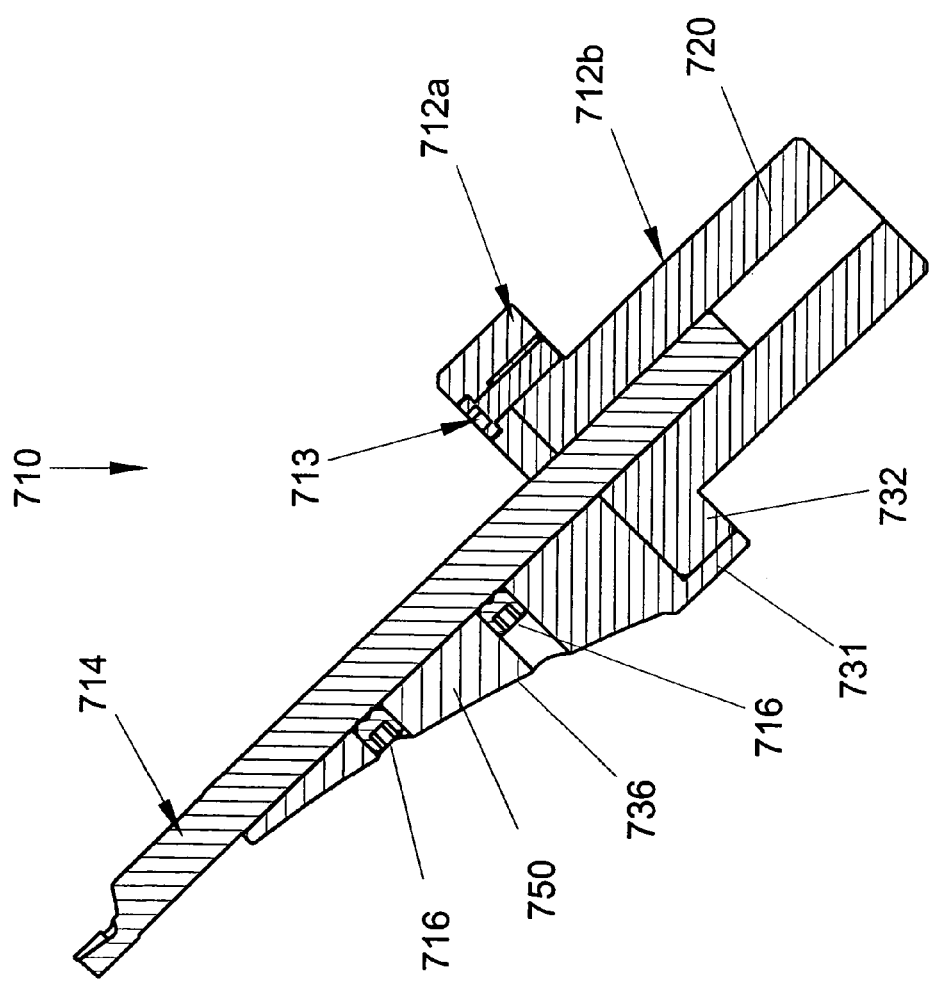
FIG. 15 is a longitudinal cross-sectional view of a tool apparatus according to an eighth embodiment of the present invention.

Finally, FIG. 15 illustrates a tooling assembly 710 according to another embodiment of the present invention. Here, the tooling assembly 710 includes a two-piece tool holder defined by forward portion 712a and rearward portion 712b. The tool holder includes a shank 720 and a tool support extension 730 attached thereto. The shank can be a modified ⅜" internal diameter tool holder available from MAZAK. And the tool support extension 730 is a specially fabricated detail composed of high speed steel or the like. A male mounting flange 732 on the rearward portion 712b of the tool holder mounts inside a female mounting flange 731 on the forward portion 712a of the tool holder, wherein both mounting flanges 731 and 732 are fastened together by cap screw fasteners 713 that slip through portions of the female mounting flange and thread into the male mounting flange as shown. Alternatively, the fasteners 713 can be bolts, rivets, dowel pins, or the like. Other fastening arrangements are contemplated such as a threaded or splined interconnection between the mounting flanges 731 and 732.

Still referring to FIG. 15, a boring bar 714 is fastened to the tool holder 712a and 712b using the set screw and dove-tail fastening arrangement described with respect to many of the embodiments above. Accordingly, set screws 716 thread into portions of the forward portion 712a of the tool holder. This embodiment provides a simple and cost effective modification to off-the-shelf tool holders in order to achieve the many benefits of the present invention as further described below.

While the present invention has been described in terms of a limited number of embodiments, it is apparent that other forms could be adopted by one skilled in the art. In other words, the teachings of the present invention encompass any reasonable substitutions or equivalents of claim limitations. For example, the structure, materials, sizes, and shapes of the individual components could be modified, or substituted with other similar structure, materials, sizes, and shapes. Specific examples include using different engagement geometry between the boring bar and tool holder and varying the specific geometry of the tapered portion of the tool holder. Any geometry of the tapered portion of the tool holder that effectuates the purposes described herein is well within the scope and contemplation of the present invention. Those skilled in the art will appreciate that other applications, including those outside of the machining industry, are possible with this invention. Accordingly, the present invention is not limited to only cylindrical boring or machining in general. Accordingly, the scope of the present invention is to be limited only by the following claims.

What is claimed is:

1. A cutting tool apparatus comprising:
a tool support extension comprising a tool bore, said tool support extension further comprising a longitudinal dove-tail portion along said bore; and
a cutting tool comprising a longitudinal dove-tail portion, said longitudinal dove-tail portion being in engagement with said longitudinal dove-tail portion of said tool support extension,
wherein said tool support extension comprises a declivitive profile.

2. The cutting tool apparatus of claim 1, wherein said tool support extension comprises an excurvate taper profile.

3. A cutting tool apparatus comprising:
a tool support extension comprising a tool bore, said tool support extension further comprising a longitudinal dove-tail portion along said bore;
a cutting tool comprising a longitudinal dove-tail portion, said longitudinal dove-tail portion being in engagement with said longitudinal dove-tail portion of said tool support extension; and
means for fastening said cutting tool to said tool support extension,
wherein said means for fastening comprises a set screw threaded through said tool support extension portion in an orientation substantially square to said longitudinal dove-tail portion.

4. A tool support apparatus comprising a shank that terminates at a radial shoulder, a tool support extension disposed adjacent the shoulder, and a tool bore, wherein said tool bore extends continuously within the tool support apparatus and comprises a circumferentially enclosed portion and a non-circumferentially enclosed portion.

5. The tool support apparatus of claim 4, wherein the non-circumferentially enclosed portion is formed by a part of the tool support extension.

6. The tool support apparatus of claim 5, wherein the tool support extension comprises a declivitive profile.

7. The tool support apparatus of claim 4, wherein the shank and the tool support extension extend along a central longitudinal axis.

8. A tool support apparatus comprising a tool bore, said tool bore comprising a circumferentially enclosed portion and a non-circumferentially enclosed portion, and a shank comprising a central longitudinal axis, wherein said tool bore extends concentrically with the central longitudinal axis of the shank.

9. The tool support apparatus of claim 4, wherein said tool bore extends eccentrically with respect to the central longitudinal axis of the shank.

10. A cutting tool holder comprising:
a shank,
a tool support extension disposed adjacent the shank, and
longitudinally oriented features extending at least partially along a tool receiving opening and adapted to engage with corresponding longitudinally extending features provided to a cutting tool receivable in the tool receiving opening,
wherein the tool receiving opening extends continuously through both the shank and the tool support extension.

11. The cutting tool holder of claim 10, wherein the shank terminates at a radially expanded shoulder.

12. The cutting tool holder of claim 10, wherein the opening defines a wall of the tool support extension adapted to only partially surround the cutting tool.

13. The cutting tool holder of claim 10, wherein the tool support extension includes at least one hole defined therein for receiving a set screw to retain the cutting tool in position.

14. The cutting tool holder of claim 10, wherein the features extending along the tool receiving opening define tongues or flanges.

15. The cutting tool holder of claim 11, wherein the opening defines a wall of the tool support extension adapted to only partially surround the cutting tool.

16. The cutting tool holder of claim 11, wherein the tool support extension includes at least one hole defined therein for receiving a set screw to retain the cutting tool in position.

17. The cutting tool holder of claim 12, wherein the tool support extension includes at least one hole defined therein for receiving a set screw to retain the cutting tool in position.

18. The cutting tool holder of claim 11, wherein the features extending along the tool receiving opening define tongues or flanges.

19. The cutting tool holder of claim 12, wherein the features extending along the tool receiving opening define tongues or flanges.

20. The cutting tool holder of claim 13, wherein the features extending along the tool receiving opening define tongues or flanges.

* * * * *